(12) United States Patent
Adams (10) Patent No.: US 9,813,654 B2
(45) Date of Patent: Nov. 7, 2017

(54) METHOD AND SYSTEM FOR TRANSMITTING DATA

(71) Applicant: SONY CORPORATION, Tokyo (JP)

(72) Inventor: Dennis Adams, Madison, WI (US)

(73) Assignee: SONY CORPORATION, Tokyo (JP)

( * ) Notice: Subject to any disclaimer, the term of this patent is extended or adjusted under 35 U.S.C. 154(b) by 375 days.

(21) Appl. No.: 14/463,231

(22) Filed: Aug. 19, 2014

(65) Prior Publication Data

US 2016/0057373 A1    Feb. 25, 2016

(51) Int. Cl.

| H04N 7/01 | (2006.01) |
|---|---|
| H04N 5/38 | (2006.01) |
| H04N 19/172 | (2014.01) |
| H04N 19/63 | (2014.01) |
| H04N 19/177 | (2014.01) |
| H04N 19/187 | (2014.01) |
| H04N 19/59 | (2014.01) |
| H04N 5/445 | (2011.01) |
| H04N 21/4363 | (2011.01) |
| H04N 21/4402 | (2011.01) |
| H04N 21/462 | (2011.01) |

(Continued)

(52) U.S. Cl.
CPC ............. *H04N 5/38* (2013.01); *G06F 3/1454* (2013.01); *G09G 5/006* (2013.01); *G09G 5/391* (2013.01); *H04N 5/44591* (2013.01); *H04N 19/172* (2014.11); *H04N 19/177* (2014.11); *H04N 19/187* (2014.11); *H04N 19/59* (2014.11); *H04N 19/63* (2014.11); *H04N 21/43637* (2013.01); *H04N 21/440227* (2013.01); *H04N 21/4621* (2013.01); *G09G 2340/0407* (2013.01); *G09G 2340/0435* (2013.01); *G09G 2350/00* (2013.01); *G09G 2370/022* (2013.01); *G09G 2370/20* (2013.01)

(58) Field of Classification Search
CPC ..... H04N 19/30; H04N 19/00569; G09G 5/00
See application file for complete search history.

(56) References Cited

U.S. PATENT DOCUMENTS

| 5,764,814 A | 6/1998 | Chen et al. |
|---|---|---|
| 5,768,535 A | 6/1998 | Chaddha et al. |

(Continued)

FOREIGN PATENT DOCUMENTS

| EP | 2330587 A1 | 6/2011 |
|---|---|---|
| EP | 2741496 A1 | 6/2014 |
| WO | 0186941 A2 | 11/2001 |

OTHER PUBLICATIONS

European Search Report for Patent Application No. 15180390.5 dated Jan. 1, 2016.

(Continued)

*Primary Examiner* — Sath V Perungavoor
*Assistant Examiner* — Patricia I Young
(74) *Attorney, Agent, or Firm* — Chip Law Group (57) ABSTRACT

Various aspects of a system and a method for transmitting data are disclosed herein. The method is included in a first electronic device. The first electronic device splits each frame of the video data into a plurality of partial resolution layers. The plurality of partial resolution layers comprises a base frame layer and one or more additional frame layers. The base frame layer and the one or more additional frame layers of frame of the video data are transmitted to a second electronic device.

19 Claims, 7 Drawing Sheets

(51) Int. Cl.
*G06F 3/14* (2006.01)
*G09G 5/00* (2006.01)
*G09G 5/391* (2006.01)

(56) References Cited

U.S. PATENT DOCUMENTS

| | | |
|---|---|---|
| 6,593,925 B1 | 7/2003 | Hakura et al. |
| 6,647,150 B2 | 11/2003 | Van Der Wal |
| 7,092,118 B2 | 8/2006 | Ferriere |
| 7,957,599 B2 | 6/2011 | Berkner et al. |
| 8,223,222 B2 | 7/2012 | Yamada |
| 8,340,415 B2 | 12/2012 | Hoppe et al. |
| 8,411,938 B2 | 4/2013 | Zhang et al. |
| 8,705,821 B2 | 4/2014 | Kanitsar et al. |
| 2002/0018072 A1* | 2/2002 | Chui .................. H04N 1/3875 345/667 |
| 2011/0221780 A1* | 9/2011 | Inada .................. G09G 5/36 345/660 |
| 2014/0153634 A1* | 6/2014 | Inada .................. H04N 19/33 375/240.01 |

OTHER PUBLICATIONS

Wang L et. al.; "Reduced-difference pyramid: a data structure for progressive image transmission" Optical Engineering, Soc. of Photo-Optical Instrumentation Engineers, Bellingham, vol. 28, No. 7, Jul. 1, 1989, pp. 708-716.

Office Action for EP Patent Application No. 15180390.5, dated Aug. 24, 2017, 8 pages.

Shi et al, "Spatially Scalable Video Coding for HEVC", XP011487158, IEEE Transactions on Circuits and Systems or Video Technology, Institute of Electrical and Electronics Engineers, USA, vol. 22, No. 12, Dec. 1, 2012, pp. 1813-1826.

Rathgen, et al., "Proposal for SVC File Format Specification", XP030041029, 73. MPEG Meeting Poznan, Motion Picture Expert Group or ISO/IEC JTC1/SC29/WG11, No. M12345, Jul. 20, 2005.

\* cited by examiner

METHOD AND SYSTEM FOR TRANSMITTING DATA

FIELD

Various embodiments of the disclosure relate to transmitting data. More specifically, various embodiments of the disclosure relate to transmitting video data based on splitting of frames.

BACKGROUND

Recent advancements in the field of image processing technology have witnessed rapid developments in the area of recording and broadcasting of video data. With the advent of new-generation multimedia capturing devices, a number of multimedia characteristics of the video data, such as resolution, have notably improved.

However, in certain scenarios, such improvements in the multimedia characteristics may, in turn, increase the file size of the recorded video data. Consequently, additional operations, such as a file transfer operation and/or a file modification operation of the recorded video files, may require broadcasting the video file. Due to increased size and the additional operations, it may take a longer time to broadcast high-resolution video files, which may be undesirable by the user.

Further limitations and disadvantages of conventional and traditional approaches will become apparent to one of skill in the art, through comparison of described systems with some aspects of the present disclosure as set forth in the remainder of the present application with reference to the drawings.

SUMMARY

A method and system are provided for transmitting data substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

The following described implementations may be found in a system and/or a method for transmitting video data. Exemplary aspects of the disclosure may comprise a method that may comprise splitting of each frame of video data into a plurality of partial resolution layers. In an embodiment, each of the plurality of partial resolution layers may comprise a base frame layer and one or more additional frame layers. The method may further comprise transmitting the base frame layer of the frame of the video data to a second electronic device.

In an embodiment, the method may further comprise transmitting one or more additional frame layers of the frame to the second electronic device based on priority information associated with the base frame layer of the frame.

In an embodiment, a resolution value of the base frame layer may be less than a resolution value of each of the one or more additional frame layers. In an embodiment, the method may comprise transmitting layer difference information between a first additional frame layer of the one or more additional frame layers and a second additional frame layer of the one or more additional frame layers. In an embodiment, the first additional frame layer of the one or more additional frame layers and the second additional frame layer of the one or more additional frame layers may be adjacent to each other.

In an embodiment, the first of the one or more additional frame layers may be determined by the second electronic device, based on the transmitted layer difference information. In an embodiment, the base frame layer of each frame of the video data may be transmitted at a first frame rate, such that the first frame rate is lower than a pre-defined frame rate. In an embodiment, a frame rate of the first of the one or more additional frame layers, adjacent to the base frame layer, may be greater than the first frame rate. In an embodiment, at least one of the one or more additional frame layers may be transmitted at a second frame rate, such that the second frame rate is greater than a frame rate of a previously transmitted one of the one or more additional frame layers.

In an embodiment, the method may further comprise transmitting the base frame layer based on one or more of resolution information, frame rate, and/or priority information of the transmitted base frame layer. In an embodiment, the method may further comprise calculating motion information of the video data based on one or more motion detection algorithms. In an embodiment, the method further comprises determining priority information of the transmitted base frame layer based on the calculated motion information of the video data.

In an embodiment, the method may further comprise receiving a plurality of parameters from the second electronic device. The plurality of parameters may comprise usage information associated with the base frame layer of the frame. In an embodiment, the usage information may be calculated based on a selection operation performed on said base frame layer of said frame. In an embodiment, the one or more additional frame layers of the frame may be transmitted to the second electronic device based on the calculated usage information.

In an embodiment, the method may further comprise determining priority information based on the received plurality of parameters. In an embodiment, the transmitted base frame layer of each frame may be displayed on the second electronic device.

Another exemplary aspect of the disclosure may comprise a method for transmitting coded video data. The method may comprise determining a group of pictures (GOP) from the coded video data. The GOP may comprise a base layer and one or more enhancement layers. The method may further comprise transmitting the base layer of a GOP to a second electronic device. In an embodiment, the method may further comprise transmitting the one or more enhancement layers to the second electronic device based on one or more of: priority information, resolution information and/or usage information associated with the base layer.

In an embodiment, the resolution information may comprise one or more resolution values associated with the base layer and the one or more enhancement layers of the GOP. In an embodiment, a resolution value of the base layer may be less than a resolution value of the one or more enhancement layers.

Figure 1:
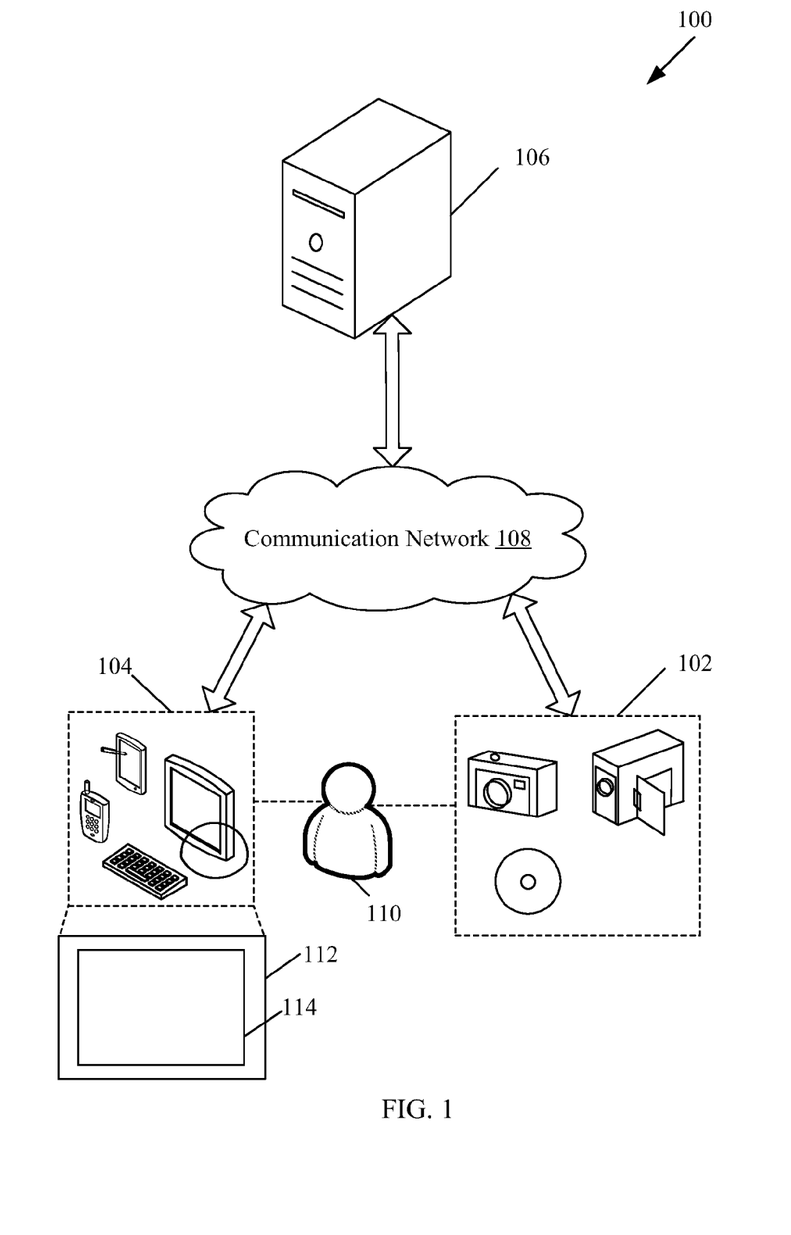
FIG. 1 is a block diagram illustrating a network environment, in accordance with an embodiment of the disclosure.

FIG. 1 is a block diagram illustrating a network environment, in accordance with an embodiment of the disclosure. With reference to FIG. 1, there is shown a network environment 100. The network environment 100 may comprise a first electronic device 102, a second electronic device 104, a multimedia server 106, a communication network 108, a user 110, a display screen 112, and a user interface 114. Notwithstanding, the disclosure may not be so limited and the network environment 100 may include a subset or a different combination of the illustrated components, for example, the first electronic device 102, and the second electronic device 104, without limiting the scope of the disclosure.

The first electronic device 102 may be communicatively coupled with the second electronic device 104, and the multimedia server 106, via the communication network 108. The user 110 may be associated with the first electronic device 102, and/or the second electronic device 104. The second electronic device 104 may comprise the display screen 112 that may be operable to render data, such as video data, via the user interface 114.

The first electronic device 102 may comprise suitable logic, circuitry, interfaces, and/or code that may be operable to record the video data. The first electronic device 102 may be further operable to execute an application to transmit the recorded video data to the second electronic device 104. Examples of the first electronic device 102 may include, but are not limited to a camera, a tablet computer, a smartphone, and/or a Personal Digital Assistant (PDA) device, a Compact-Disc (CD), a Blu-ray Disc (BD), a DVD-ROM, a USB storage device, a flash drive, a pen drive, and/or a memory card.

The second electronic device 104 may comprise suitable logic, circuitry, interfaces, and/or code that may be operable to receive the video data transmitted by the first electronic device 102. The second electronic device 104 may be further operable to edit the video data received from the first electronic device 102. The second electronic device 104 may be further operable to render the received video data on the display screen 112, via the user interface 114. Examples of the second electronic device 104 may include, but are not limited to laptops, tablet computers, smartphones, and/or Personal Digital Assistant (PDA) devices. Although for simplicity, FIG. 1 shows only one first electronic device 102 and one second electronic device 104, one skilled in the art may appreciate that the disclosed embodiments may be implemented for a larger number of first electronic devices and the second electronic devices in the network environment 100, within the scope of the disclosure.

The multimedia server 106 may comprise suitable logic, circuitry, interfaces, and/or code that may be operable to stream the video data to the first electronic device 102, via the communication network 108. The multimedia server 106 may be further operable to organize and manage a repository of the video data that may be retrieved by the first electronic device 102. The multimedia server 106 may be further operable to serve multimedia on demand content to a requesting device, such as the first electronic device 102. In an embodiment, the multimedia server 106 may be a generic network-attached storage, for example, a Home Theater Personal Computer (HTPC) running Windows XP Media Center Edition®. In an embodiment, the multimedia server 106 may be a commercial web server that may host multimedia for a large web site. Examples of such a commercial multimedia server may include, but are not limited to Sony's Gigajuke Music Server®, Mcrew®, MediaPortal®, MythTV®, Sun Music®, Sonata®, Olive 4HD®, NuVo Technologies Music Port®, and/or Escient Fireball SE-80 Digital Music Manager®. In an embodiment, the multimedia server 106 may be implemented as a part of a server cloud. In an embodiment, the multimedia server 106 may be accessed and managed by a third party.

The communication network 108 may comprise a medium, through which the first electronic device 102 may communicate with the second electronic device 104, and the multimedia server 106. Examples of the communication network 108 may include, but are not limited to the Internet, a Wireless Fidelity (Wi-Fi) network, a Wireless Local Area Network (WLAN), a Local Area Network (LAN), a telephone line (POTS), and/or a Metropolitan Area Network (MAN). The communication may be in accordance with various wired and wireless communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the first electronic device 102 may receive the video data in a coded format. The video data may be coded based on one or more coding techniques. Examples of the one or more coding techniques may include, but are not limited to, a Scalable Video Coding technique (SVC), and/or a Moving Picture Experts Group (MPEG) video compression technique.

In an embodiment, the video data may be pre-recorded in the first electronic device 102, associated with the user 110. In an embodiment, the first electronic device 102 may be operable to download the video data from the multimedia server 106. In an embodiment, the first electronic device 102 may be operable to receive the video data from a television broadcast station (not shown). In an embodiment, the video data may include, but is not limited to, a live sports event, a movie file, and/or an audio file.

In an embodiment, the first electronic device 102 may be operable to determine a plurality of frames from the recorded video data. In an embodiment, the plurality of frames may be determined with respect to one or more time stamps, associated with the recorded multimedia content. For example, a first frame may be determined at a first time stamp, such as, "00:10 seconds", while a second frame may be determined at a second time stamp, such as, "00:15 seconds". Both the first and the second time stamps may be determined with respect to a reference mark, such as a starting point of the recorded video data.

In an embodiment, the plurality of frames may be determined at a fixed pre-defined interval between the one or more time stamps. In an embodiment, the pre-defined interval may be provided by the user 110. In an embodiment, the plurality of frames may be determined at random intervals between the one or more time stamps. In an embodiment, the plurality of frames may be selected by the user 110. In an embodiment, the plurality of frames may be determined based on a set of algorithms, such as an adaptive temporal sampling algorithm. Notwithstanding, the disclosure may not be so limited, and other techniques and algorithms known in the art for determining frames from the video data, may be implemented without limiting the scope of the disclosure.

In an embodiment, the first electronic device 102 may be operable to split each of the plurality of frames into a plurality of partial resolution layers. The plurality of frames may be arranged in a sequence that starts from a highest resolution layer to a lowest resolution layer. In an embodiment, the arrangement may be in the form of a resolution pyramid of the plurality of partial resolution layers. The resolution pyramid may be based on resolution values of each of the plurality of partial resolution layers. In an embodiment, the base of the resolution pyramid may correspond to the highest resolution layer and the vertex of the resolution pyramid may correspond to the lowest resolution layer. In an embodiment, the lowest resolution layer may correspond to a base frame layer. In an embodiment, the plurality of partial resolution layers, other than the base frame layer, may correspond to a set of additional frame layers. In an embodiment, the set of additional frame layers may comprise one or more additional frame layers. In an embodiment, the plurality of partial resolution layers in the resolution pyramid may be generated by utilizing a Laplacian pyramid. In accordance with the embodiment, a set of Laplacian coefficients may correspond to a resolution of each of the plurality of partial resolution layers. In an embodiment, the resolution pyramid may be generated based on a wavelet compression technique. It may be obvious to a person skilled in the art that other techniques may be utilized to generate the resolution pyramid, without limiting the scope of the disclosure.

In an embodiment, the first electronic device 102 may be operable to transmit the plurality of base frame layers that correspond to each of the plurality of frames, to the second electronic device 104. In an embodiment, the plurality of base frame layers may be transmitted to the second electronic device 104, via the communication network 108. In an embodiment, a base frame layer of a first frame may be transmitted to the second electronic device 104, via a first type of the communication network 108, such as the Wireless Local Area Network (WLAN). In an embodiment, a base frame layer of a second frame may be transmitted to the second electronic device 104, via a second type of the communication network 108, such as the telephone line (POTS).

In an embodiment, the plurality of base frame layers that correspond to each of the plurality of frames may be transmitted at a first frame rate. In an embodiment, the first frame rate may correspond to a pre-defined frame rate, such as a standard frame rate of 60 frames per second (fps). In an embodiment, a first set of the plurality of base frame layers may be transmitted at the first frame rate, such that the first set of the plurality of base frame layers correspond to odd-numbered frames. Consequently, as the first set of the plurality of base frame layers is half of the plurality of base frame layers, the first frame rate may be determined as a frame rate that is half of the standard rate.

In an embodiment, a second set of the plurality of base frame layers may be transmitted at the first frame rate, such that the second set of the plurality of base frame layers correspond to even-numbered frames. Consequently, as the second set of the plurality of base frames is half of the plurality of base frame layers, the first frame rate may be determined as a frame rate that is half of the standard rate. For example, the first frame rate is initially the same as that of the pre-defined frame rate, such as "60 fps". Thus, the plurality of base frame layers of each of the plurality of frames may be transmitted to the second electronic device 104, at the first frame rate, such as "60 fps". In an instance, in order to reduce the first frame rate by half, such that the second frame rate is, "30 fps", the first set of the plurality of base frame layers that corresponds to the odd-numbered frames, may be transmitted. In another instance, in order to reduce the first frame rate by half, such that the third frame rate is, "30 fps", the second set of the plurality of base frame layers that corresponds to the even-numbered frames, may be transmitted.

In an embodiment, the second electronic device 104 may receive the plurality of base frame layers that correspond to each of the plurality of frames. The second electronic device 104 may render the received plurality of base frame layers on the display screen 112, via the user interface 114. In an embodiment, the second electronic device 104 may be operable to execute a modification operation on the plurality of base frame layers, which are rendered on the display screen 112. Examples of the modification operation may include, but are not limited to, a trim operation, a frame selection operation, and/or an edit operation.

In an embodiment, the user 110, when associated with the second electronic device 104, may provide a request to download the video data from the multimedia server 106. Based on the request, the multimedia server 106 may be operable to determine the plurality of frames from the video data that may be transmitted to the second electronic device 104. The multimedia server 106 may perform similar functionalities, such as splitting each frame of video data into a plurality of partial resolution layers that are executed by the first electronic device 102, as already explained above.

Notwithstanding, the disclosure may not be so limited, and similar functionality, as explained above with respect to the plurality of frames determined from video data, may be implemented for the plurality of GOPs determined from the coded video data, without limiting the scope of the disclosure.

Figure 2:
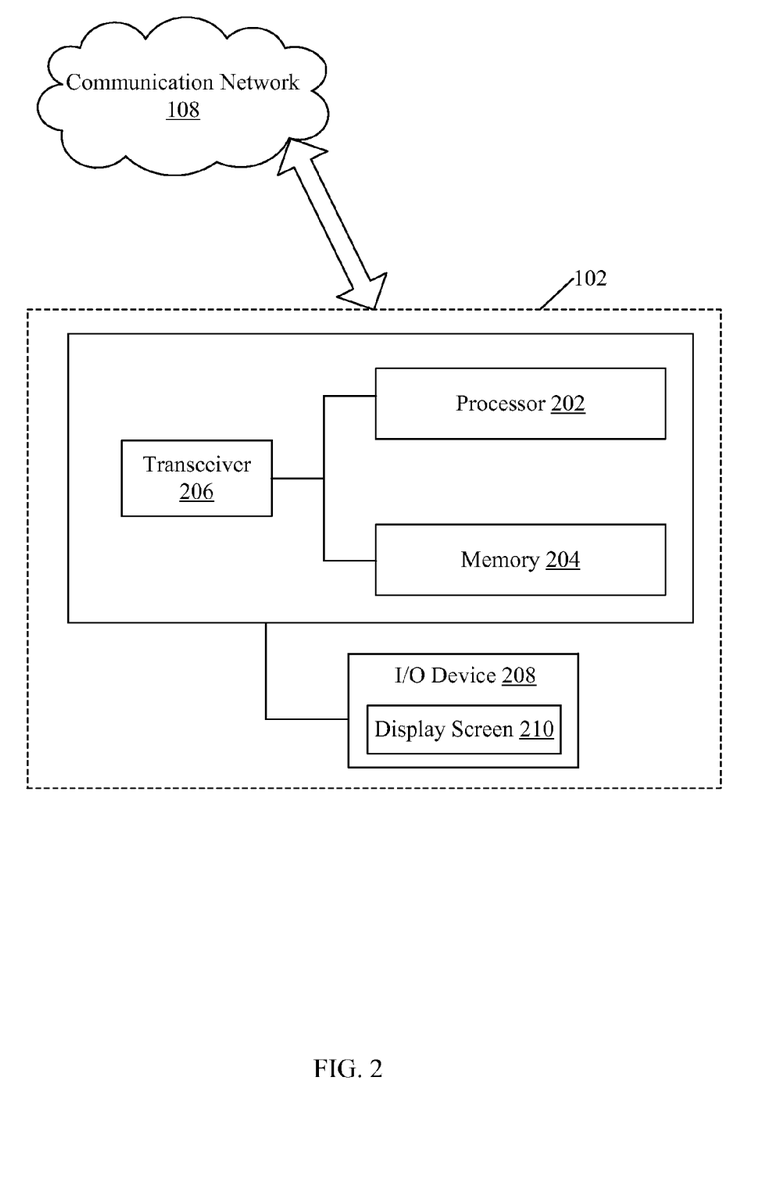
FIG. 2 is a block diagram illustrating a first electronic device, in accordance with an embodiment of the disclosure.

FIG. 2 is a block diagram illustrating a first electronic device, in accordance with an embodiment of the disclosure. FIG. 2 is explained in conjunction with elements from FIG. 1. With reference to FIG. 2, there is shown the first electronic device 102. The first electronic device 102 may comprise one or more processors, such as a processor 202, a memory 204, a transceiver 206, and one or more Input-Output (I/O) devices, such as an I/O device 208. The transceiver 206 may be communicatively coupled with the processor 202, the memory 204, and the I/O device 208. Further, the transceiver 206 may be communicatively coupled with the second electronic device 104 and the multimedia server 106, via the communication network 108.

The processor 202 may comprise suitable logic, circuitry, interfaces, and/or code that may be operable to execute a set of instructions stored in the memory 204. The processor 202 may be operable to execute an application to transmit the video data to the second electronic device 104, based on one or more of resolution information, frame rate, and/or priority information of the transmitted video data. In an embodiment, the processor 202 may be operable to determine the priority information, based on a plurality of parameters. The plurality of parameters may correspond to, but are not limited to, usage information, and/or motion information of the video data at the second electronic device 104. The processor 202 may be implemented based on a number of processor technologies known in the art. Examples of processor 202 may include an X86-based processor, a Reduced Instruction Set Computing (RISC) processor, an Application-Specific Integrated Circuit (ASIC) processor, a Complex Instruction Set Computing (CISC) processor, or other processors.

The memory 204 may comprise suitable logic, circuitry, interfaces, and/or code that may be operable to store a set of instructions, executable by the processor 202. The memory 204 may be further operable to record the video data downloaded from the multimedia server 106. The memory 204 may be operable to store the plurality of parameters associated with the recorded video data. The memory 204 may be further operable to store resolution information, frame rate information, and/or priority information of the recorded video data. The memory 204 may be further operable to store a set of algorithms, which may be used by the processor 202 to determine a plurality of frames from the recorded video data. The memory 204 may be further operable to store one or more motion detection algorithms, which may be used by the processor 202 to determine motion information in the video data. The memory 204 may be implemented based on, but not limited to a Random Access Memory (RAM), a Read-Only Memory (ROM), a Hard Disk Drive (HDD), a storage server, and/or a Secure Digital (SD) card.

The transceiver 206 may comprise suitable logic, circuitry, interfaces, and/or code that may be operable to communicate with the multimedia server 106, via various communication interfaces. The transceiver 206 may implement known technologies for supporting wired or wireless communication with the communication network 108. The transceiver 206 may include, but is not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 206 may communicate via wireless communication with networks, such as the Internet, an Intranet, and/or a wireless network, such as a cellular telephone network, a wireless local area network (LAN), and/or a metropolitan area network (MAN), and/or other devices. The wireless communication may use a plurality of communication standards, protocols and technologies including, but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 208 may comprise various input and output devices that may be operable to receive an input or provide an output to the user 110. The I/O device 208 may comprise various input and output devices that may be operable to communicate with the processor 202. Examples of the input devices may include, but are not limited to a keyboard, a mouse, a joystick, a touch screen, a microphone, a camera, a motion sensor, a light sensor, and/or a docking station. Examples of the output devices may include, but are not limited to, the display screen 112, and/or a speaker.

In operation, the processor 202 of the first electronic device 102 may be operable to record the video data in the memory 204. In an embodiment, the processor 202 may be operable to download the video data from the multimedia server 106, via the transceiver 206. In an embodiment, the processor 202 may be operable to receive the video data from a television broadcast station (not shown), via the transceiver 206 and a decoder (not shown).

In an embodiment, the processor 202 may be operable to determine the plurality of frames from the recorded or received video data, based on the set of algorithms, such as the adaptive temporal sampling algorithm. The set of algorithms may be retrieved from memory 204, by the processor 202.

In an embodiment, the processor 202 may be operable to split each of the plurality of frames into a plurality of partial resolution layers. The plurality of resolution layers may be arranged in a sequence that starts from a highest resolution layer to a lowest resolution layer. In an embodiment, the processor 202 may arrange the sequence in the form of a resolution pyramid of the plurality of partial resolution layers. In an embodiment, the base of the resolution pyramid may correspond to the highest resolution layer, and the vertex of the resolution pyramid may correspond to the lowest resolution layer. In an embodiment, the lowest resolution layer may correspond to a base frame layer. In an embodiment, the plurality of partial resolution layers, other than the base frame layer, may correspond to a set of additional frame layers. In an embodiment, the set of additional frame layers may comprise one or more partial resolution layers. In an embodiment, the processor 202 may be operable to store the resolution information of the base frame layer and the set of additional frame layers for each of the plurality of frames, in the memory 204.

In an embodiment, the processor 202 may be operable to retrieve the plurality of base frame layers that correspond to each of the plurality of frames from the memory 204. In an embodiment, the processor 202 may be operable to transmit the retrieved plurality of base frame layers to the second electronic device 104, based on a request received from the second electronic device 104. In an embodiment, the plurality of base frame layers may be transmitted to the second electronic device 104, via the transceiver 206. In an embodiment, the processor 202 may be operable to transmit the first set of the plurality of base frame layers that correspond to the first set of the plurality of frames, to the second electronic device 104. The first set of the plurality of frames may correspond to one or more even-numbered frames of the plurality of frames. In an embodiment, the processor 202 may be operable to transmit the second set of the plurality of base frame layers that correspond to the second set of the plurality of frames, to the second electronic device 104. The second set of the plurality of frames may correspond to one or more odd-numbered frames of the plurality of frames.

In an embodiment, the transceiver 206 may be operable to receive the priority information from the second electronic device 104. The priority information may comprise one or more user preferences that may be provided by the user 110, via the user interface 114. In an embodiment, the processor 202 may be operable to determine the priority information, based on the plurality of parameters, such as usage information, and/or motion information. The processor 202 may be operable to store the priority information in the memory 204. In an embodiment, the usage information and/or motion information may be received from the second electronic device 104, based on a selection of one or more base frame layers from the plurality of base frame layers. The one or more base frame layers may be selected by the user 110. The user 110 may be associated with the second electronic device 104. In an embodiment, the motion information may be determined by the processor 202, based on one or more motion detection algorithms stored in the memory 204.

The processor 202 may be operable to store the received priority information in the memory 204. Based on the priority information, the processor 202 may be operable to determine one or more sets of additional frame layers, each of the one or more sets of additional frame layers may correspond to one of the plurality of frames. Each set of the one or more sets of additional frame layers may comprise one or more partial resolution layers. Each of the one or more sets of additional frame layers may correspond to one of the plurality of frames.

In an embodiment, the processor 202 may be operable to transmit a first partial resolution layer, from each of the one or more sets of additional frame layers, to the second electronic device 104. Such first partial resolution layers may be positioned next to each of the one or more base frame layers, selected at the second electronic device 104 by the user 110. The frame rate of each first partial resolution layer may be greater than the frame rate of the corresponding base frame layer. In an embodiment, the processor 202 may be operable to transmit a second partial resolution layer, from each of the one or more sets of additional frame layers, to the second electronic device 104. Such second partial resolution layers may be positioned next to each of the first partial resolution layers transmitted to the second electronic device 104. The frame rate of each second partial resolution layer may be greater than the frame rate of the corresponding first partial resolution layer. Although for simplicity, the embodiment describes only the first partial resolution layer and the second partial resolution layer, one skilled in the art may appreciate that further subsequent partial resolution layers may be transmitted such that the frame rate of each subsequent partial resolution layer is greater than the frame rate of the proceeding partial resolution layer, without limiting the scope of the disclosure.

Notwithstanding, the disclosure may not be so limited, and the processor 202 in the first electronic device 102 may be operable to perform splitting and transmitting of the plurality of GOPs based on priority information, resolution information and/or usage information, similar to the splitting and transmitting of the plurality of frames, as explained above, without limiting the scope of the disclosure.

Figure 3:
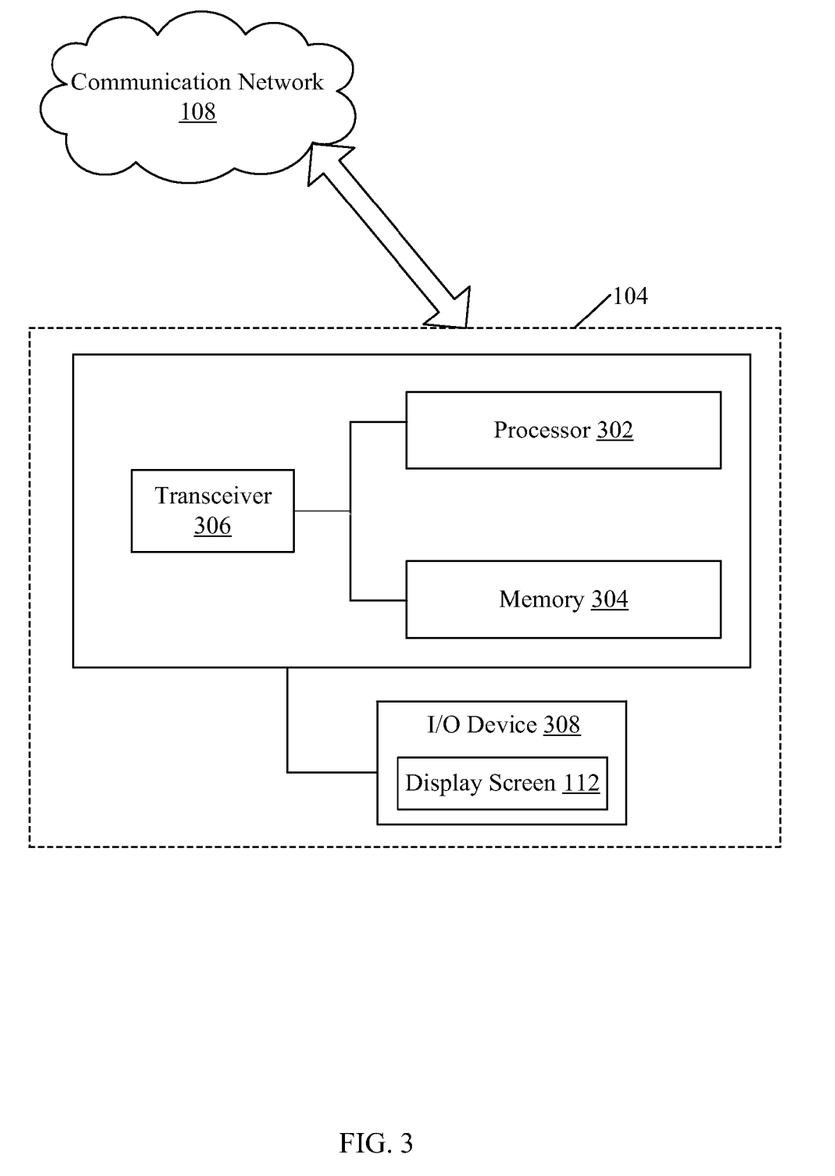
FIG. 3 is a block diagram illustrating a second electronic device, in accordance with an embodiment of the disclosure.

FIG. 3 is a block diagram illustrating a second electronic device, in accordance with an embodiment of the disclosure. FIG. 3 is explained in conjunction with elements from FIG. 1 and FIG. 2. With reference to FIG. 3, there is shown the second electronic device 104. The second electronic device 104 may comprise one or more processors, such as a processor 302, a memory 304, a transceiver 306, and one or more Input-Output (I/O) devices, such as an I/O device 308. The transceiver 306 may be communicatively coupled with the processor 302, the memory 304, and the I/O device 308. Further, the transceiver 206 may be communicatively coupled with the first electronic device 102, and the multimedia server 106, via the communication network 108.

The processor 302 may comprise suitable logic, circuitry, interfaces, and/or code that may be operable to execute a set of instructions stored in the memory 304. The processor 302 may be further operable to receive the video data, from the first electronic device 102, via the transceiver 306. In an embodiment, the processor 302 may be operable to receive the base frame layer, of each of the plurality of frames of the video data, from the first electronic device 102. In an embodiment, the processor 302 may be operable to render the received base frame layers of each of the plurality of frames, on the display screen 112. The processor 302 may be further operable to determine the priority information based on the usage information, and/or motion information of the received video data. In an embodiment, the processor 302 may be operable to transmit the priority information to the first electronic device 102. In an embodiment, the processor 302 may be operable to perform functionalities that may be similar to the functionalities performed by the processor 202. The processor 302 may be implemented based on a number of processor technologies known in the art. Examples of processor 302 may be an X86-based processor, a Reduced Instruction Set Computing (RISC) processor, an Application-Specific Integrated Circuit (ASIC) processor, a Complex Instruction Set Computing (CISC) processor, or other such processors.

The memory 304 may comprise suitable logic, circuitry, interfaces, and/or code that may be operable to store a set of instructions, executable by the processor 302. The memory 304 may be operable to store the plurality of parameters associated with the received video data. The plurality of parameters may correspond to, but are not limited to, usage information, and/or motion information. The memory 304 may further store priority information of the received video data. The memory 304 may be further operable to store one or more motion detection algorithms, which may be used by the processor 302 to determine motion information in the received video data. The memory 304 may be implemented based on, but not limited to a Random Access Memory (RAM), a Read-Only Memory (ROM), a Hard Disk Drive (HDD), a storage server, and/or a Secure Digital (SD) card.

The transceiver 306 may comprise suitable logic, circuitry, interfaces, and/or code that may be operable to communicate with the first electronic device 102, and the multimedia server 106, via various communication interfaces. The transceiver 306 may implement known technologies for supporting wired or wireless communication with the communication network 108. The transceiver 306 may include, but is not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 306 may communicate via wireless communication with networks, such as the Internet, an Intranet, and/or a wireless network, such as a cellular telephone network, a wireless local area network (LAN), and/or a metropolitan area network (MAN). The wireless communication may use a plurality of communication standards, protocols and technologies including, but not limited to a Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 308 may comprise various input and output devices that may be operable to receive an input or provide an output to the user 110. The I/O device 308 may comprise various input and output devices that may be operable to communicate with the processor 302 Examples of the input devices may include, but are not limited to a keyboard, a mouse, a joystick, a touch screen, a microphone, a camera, a motion sensor, a light sensor, and/or a docking station. Examples of the output devices may include, but are not limited to, the display screen 112, and/or a speaker.

In operation, the processor 302 may be operable to receive the video data from the first electronic device 102, via the transceiver 306. In an embodiment, the processor 302 may be operable to receive the base frame layer of each of the plurality of frames, from the first electronic device 102. In an embodiment, the processor 302 may be operable to store the received base frame layer of each of the plurality of frames in the memory 304. In an embodiment, the processor 302 may be operable to store resolution information, and/or frame rate information in the memory 304. Both of the resolution information, and/or frame rate information may correspond to the received base frame layer of each of the plurality of frames. In an embodiment, the processor 302 may be operable to display the received base frame layers on the user interface 114, rendered on the display screen 112 of the second electronic device 104.

In an embodiment, the received base frame of each of the plurality of frames may be rendered as a plurality of thumbnails on the user interface 114. In an embodiment, a thumbnail associated with the base frame layer of each of the plurality of frames, and an associated timeline may be rendered on the display screen 112, via the user interface 114.

In an embodiment, the user 110, associated with the second electronic device 104, may select a thumbnail from the plurality of thumbnails. Each of the plurality of thumbnails may correspond to each of the plurality of base frame layers. The plurality of thumbnails and base frame layers may be received by the processor 302, via the transceiver 306. In an embodiment, the processor 302 may be operable to execute one or more modification operations on the selected thumbnail, based on an input provided by the user 110. Examples of the input that may be provided by the user 110 may include, but are not limited to, a touch-based based input, and/or a touch-less input. The touch-based input may comprise a screen-tap input, and/or a screen-pinch input. The touch-less input may comprise a gesture-based input (such as a finger-click), and/or a voice-based input.

In an embodiment, the user 110, associated with the second electronic device 104, may perform one or more modification operations on the displayed plurality of thumbnails on the user interface 114. In an embodiment, the one or more modification operations may include, but are not limited to a trim operation, a color enhancement operation, a deletion operation, a zoom-in operation, a zoom-out operation, and/or a selection operation. In an embodiment, the one or more modification operations may correspond to priority information. In an embodiment, the priority information may comprise one or more user preferences that may be provided by the user 110, via the user interface 114. In an embodiment, the priority information may be determined based on the plurality of parameters, such as usage information, and/or motion information. In an embodiment, the plurality of parameters may be provided by the user 110, via the second electronic device 104, based on a selection one or more base frame layers. In an embodiment, the plurality of parameters may be dynamically determined by the processor 302. In an embodiment, the processor 302 may be operable to indicate the priority information based on a high priority flag associated with the selected one or more base frame layers.

In an embodiment, the processor 302 may be operable to determine the usage information, based on a selection of one or more of the plurality of thumbnails. The user 110 may perform the one or more modification operations, such as a zoom-in operation or a zoom-out operation, on the selected one or more of the plurality of thumbnails, via the user interface 114. In an embodiment, the processor 302 may be operable to determine the motion information, based on a motion analysis of content of the one or more of the plurality of thumbnail images, rendered on the user display screen 112. In an embodiment, the motion information may be determined by the processor 302 based on one or more motion detection algorithms, retrieved from the memory 304. In an embodiment, the processor 302 may be operable to transmit the determined usage information, and/or the motion information, to the first electronic device 102, via the communication network 108.

In an embodiment, the processor 302 may be operable to determine the priority information based on one or more user preferences, such as a time interval, provided by the user 110. The priority information may be received from the user 110, via the user interface 114. For example, processor 302 may determine the priority information, based on a time interval, such as a time interval of "1:00 AM to 2:00 AM", provided via the user interface 114. The time interval may be provided by the user 110 to prioritize the reception of one or more of the plurality of base frame layers, based on the time interval. Consequently, the processor 302 may be operable to receive the corresponding plurality of base frame layers within the time interval, such as "1:00 AM to 2:00 AM". In an embodiment, the processor 302 may be operable to transmit the priority information to the first electronic device 102, via transceiver 306.

In an embodiment, the processor 302 may be operable to receive one or more sets of additional frame layers, based on the transmitted priority information, via the transceiver 306. Such one or more sets of additional frame layers may correspond to one or more of the plurality of base frame layers, received from the first electronic device 102. In an embodiment, the processor 302 may be operable to render the received one or more sets of additional frame layers, in conjunction with the selected one or more of the plurality of base frame layers. The one or more sets of additional frame layers and the one or more of the plurality of base frame layers may be rendered on the display screen 112. In an embodiment, the reception and display of the one or more sets of additional frame layers may increase the resolution of the displayed thumbnail images, and further enhance user experience by increasing the picture quality of the displayed thumbnail images.

In an embodiment, the processor 302 may be operable to receive a first partial resolution layer of each of the one or more sets of additional frame layers, from the first electronic device 102. Such first partial resolution layers may be adjacent to each of the one or more base frame layers that may be selected at the second electronic device 104. In an embodiment, the first partial resolution layer may be transmitted at a frame rate that is greater than a frame rate of a previously transmitted corresponding base frame layer. In an embodiment, the first partial resolution layer may be transmitted at a frame rate that is greater than a frame rate of a previously transmitted one of the one or more additional frame layers.

In an embodiment, the processor 302 may be operable to receive a second partial resolution layer from each of the one or more sets of additional frame layers, via the first electronic device 102. Such second partial resolution layers may be positioned next to each of the first partial resolution layers that are received via the first electronic device 102. The frame rate of the second partial resolution layer may be greater than the frame rate of the corresponding first partial resolution layer. In an embodiment, the second partial resolution layer may be transmitted at a frame rate that is two times a frame rate of a previously transmitted corresponding first partial resolution layer. Although for simplicity, the embodiment shows only the first partial resolution layer and the second partial resolution layer, one skilled in the art may appreciate that further subsequent partial resolution layers may be received such that the frame rate of each subsequent partial resolution layer is greater than the frame rate of the preceding partial resolution layer, without limiting the scope of the disclosure.

In an exemplary scenario, the processor 302 may be operable receive a predetermined number of frames, such as six frames, from the first electronic device 102. In an embodiment, the first electronic device 102 may be operable to determine a plurality of frames from the recorded video data. In an embodiment, the first electronic device 102 may further split each frame of the six frames into a plurality of partial resolution layers. For each frame, the partial resolution layer may comprise a base frame layer and a set of additional frame layers, such as three additional frame layers. The base frame layer of each frame may correspond to a partial resolution layer with the lowest resolution among the plurality of partial resolution layers. The process of splitting the frames into the plurality of partial resolution layers will be further explained in FIG. 4. In accordance with the exemplary scenario, the second electronic device 104 may receive six base frame layers from the first electronic device 102, via the communication network 108.

The processor 302 may be further operable to render each of the received six base frame layers on the display screen 112, via the user interface 114, as six thumbnail images in a sequence. In an embodiment, the user 110, associated with the second electronic device 104, may select the first thumbnail image and the third thumbnail image from the sequence. Based on the selection of the first and the third thumbnails, the processor 302 may associate a high priority flag with the first base frame layer and the third base frame layer. In an embodiment, the high priority flag may be a data value, such as "1", associated with the first and the third base frame layer. The first base frame layer corresponds to the first thumbnail image selected by the user 110. The third base frame layer corresponds to the third thumbnail selected by the user 110. The processor 302 may further associate a low priority flag to the second base frame layer, fourth base frame layer, fifth base frame layer, and the sixth base frame layer. In an embodiment, the low priority flag may be another data value, such as "0", associated with the second, fourth, fifth, and the sixth base frame layers. Based on the high priority flags and the low priority flags associated with the rendered thumbnails, the processor 302 may determine the priority information as a set of data values, such as "{1, 0, 1, 0, 0, 0}". Such a set of data values may be associated with the six base frame layers that are received from the first electronic device 102. The processor 302 may be operable to transmit the determined priority information, such as the set of data values "{1, 0, 1, 0, 0, 0}", to the first electronic device 102, via the communication network 108.

In an embodiment, the processor 302 may be operable to determine the priority information based on one or more user preferences, such as a time interval, provided by the user 110, via the user interface 114. For example, the user 110 may provide the time interval, such as a duration of "10 seconds" that occurs between 50th second and 60th second, measured with respect to a reference time. Based on the time interval provided by the user 110, the processor 302 may determine the priority information for one or more base frame layers, as "1". The one or more base frame layers may correspond to one or more frames that may be determined for the duration of "10 seconds". In an embodiment, a plurality of time intervals may be provided by the user 110 such that the one or more base frame layers may correspond to one or more frames determined for a duration of each of the plurality of time intervals.

Based on the transmitted priority information, the processor 302 may be operable to receive two first additional frame layers that correspond to the first frame and the third frames, respectively, from the second electronic device 104. In an embodiment, the processor 302 may be operable to simultaneously receive three additional frame layers that correspond to the first frame with the data value of the high priority flag, such as "1", via the first electronic device 102. Similarly, the processor 302 may be further operable to simultaneously receive three additional frame layers that correspond to the third frame with data value of the high priority flag as "1", via the first electronic device 102.

In such an exemplary scenario, the first and the third base frame layers, rendered at the display screen 112 of the second electronic device 104, may have a first value of resolution. As the second electronic device 104 receives the set of three additional frame layers that correspond to the first frame, via the first electronic device 102, the first value of resolution may be increased to a second value of resolution. Similarly, as the second electronic device 104 receives the set of three additional frame layers that correspond to the third frame, the first value of resolution may be increased to a second value of resolution. It may be apparent to one of skill in the art that the reception and display of the one or more sets of additional frame layers may increase the resolution of the displayed thumbnail images, and further enhance user experience by increasing the number of pixels of the displayed thumbnail images, without departing from the scope of the present disclosure.

Notwithstanding, the disclosure may not be so limited, and the processor 302 in the second electronic device 104 may be operable to display thumbnails and transmit usage information of the plurality of GOPs that is received from the first electronic device 102, similar to the displaying and transmitting usage information of the plurality of frames, as explained above, without limiting the scope of the disclosure.

Figure 4:
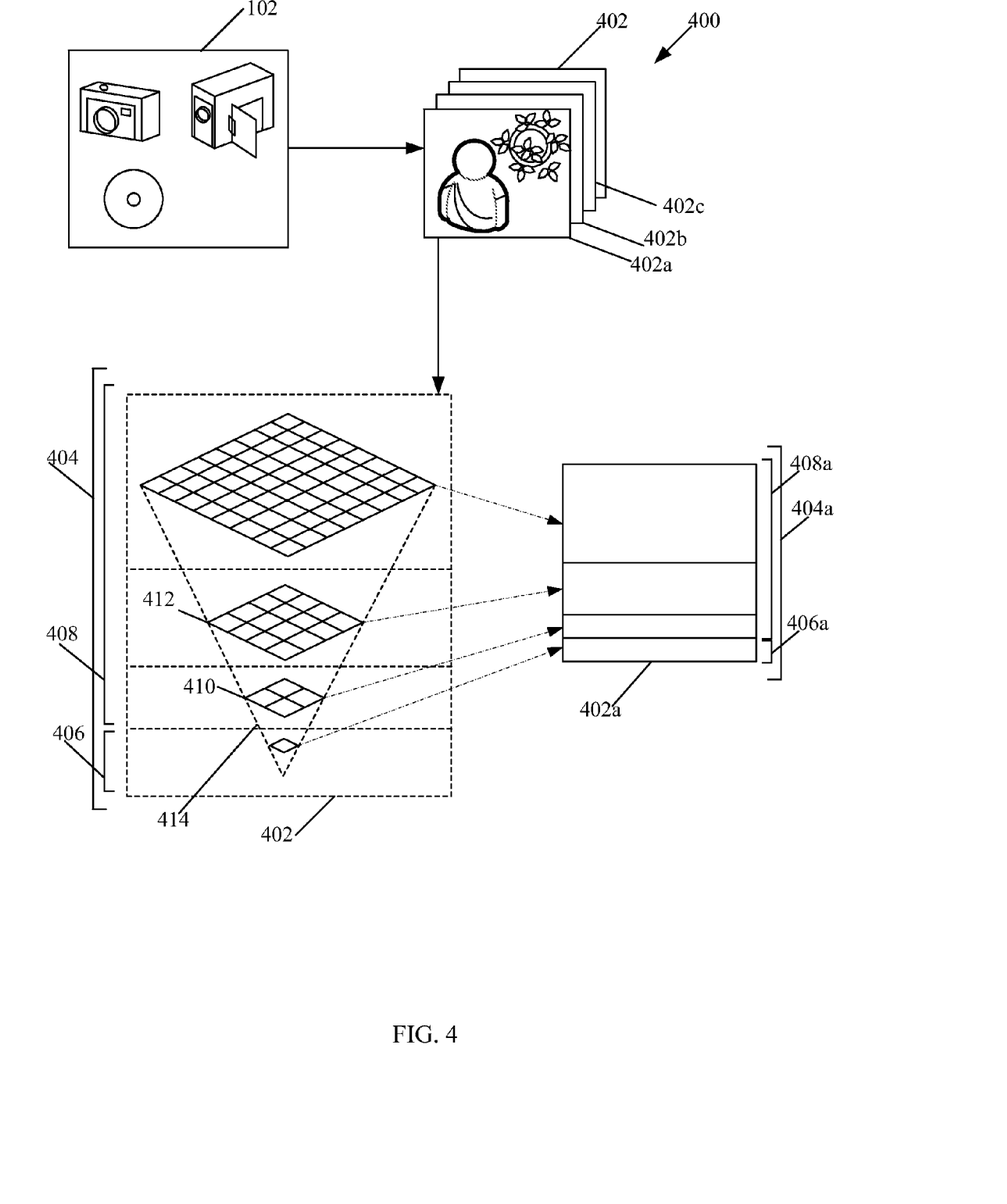
FIG. 4 illustrates an exemplary scenario of splitting of frames into partial resolution layers, in accordance with an embodiment of the disclosure.

FIG. 4 illustrates an exemplary scenario of splitting of frames into partial resolution layers at the first electronic device 102, in accordance with an embodiment of the disclosure. FIG. 4 is explained in conjunction with elements from FIG. 1, FIG. 2, and FIG. 3. With reference to FIG. 4, there is shown a plurality of frames 402. The plurality of frames 402 may comprise a first frame 402a, a second frame 402b, and a third frame 402c. There is also shown a plurality of partial resolution layers 404 that correspond to each of the plurality of frames 402. For instance, the first frame 402a may comprise a first plurality of partial resolution layers 404a. Further, each of the plurality of partial resolution layers 404 may comprise a base frame layer 406 and a set of additional frame layers 408, which may collectively correspond to a resolution pyramid 414 of the plurality of frames 402. The set of additional frame layers 408 may comprise one or more partial resolution layers. With reference to FIG. 4, a first plurality of partial resolution layers 404a, which correspond to the first frame 402a, may comprise a first base frame layer 406a, and a first set of additional frame layers 408a. Similarly, for a second frame 402b, the second plurality of partial resolution layers 404b (not shown) may comprise a second base frame layer 406b (not shown), and a second set of additional frame layers 408b (not shown). The set of additional frame layers 408 may comprise a first additional frame layer 410, and a second additional frame layer 412.

In an embodiment, the processor 202 may be operable to determine the plurality of frames 402 from the recorded video data, based on the set of algorithms, such as the adaptive temporal sampling algorithm. The processor 202 may be further operable to associate one or more time stamps with each of the plurality of frames 402. In an embodiment, another user (not shown) associated with the first electronic device 102, may provide an input, that comprises a time-based data value (such as "0.5 seconds"), based on which the plurality of frames from the recorded video data may be determined. In an embodiment, a second user may provide a second input that comprises a time interval, such as "0.3 seconds", based on which the plurality of frames from the recorded video data may be determined.

In an embodiment, the first electronic device 102 may be operable to split each of the plurality of frames 402, into the plurality of partial resolution layers 404. The plurality of partial resolution layers 404 are arranged in a sequence of a highest resolution layer to a lowest resolution layer. In an embodiment, the arrangement may be in the form of the resolution pyramid 414 of the plurality of partial resolution layers 404, as shown in FIG. 4. The resolution pyramid 414 may be based on the resolution values of each of the plurality of partial resolution layers 404. In an embodiment, the base of the resolution pyramid 414 may correspond to the highest resolution layer and the vertex of the resolution pyramid 414 may correspond to the lowest resolution layer. In an embodiment, the lowest resolution layer may correspond to the base frame layer 406. In an embodiment, the plurality of partial resolution layers 404 other than the base frame layer 406 may correspond to the set of additional frame layers 408. In an embodiment, the resolution pyramid 414 may be a Laplacian pyramid that may be utilized to generate the plurality of partial resolution layers 404. In accordance with the embodiment, a set of Laplacian coefficients may correspond to a resolution of each of the plurality of partial resolution layers 404. In an embodiment, the resolution pyramid 414 may be generated based on the wavelet compression technique. It may be evident to a person skilled in the art that other techniques may be utilized to generate the resolution pyramid 414, without limiting the scope of the disclosure.

Such a splitting may be based on a resolution of each of the plurality of partial resolution layers 404. Each of the plurality of partial resolution layers 404 are further grouped into a base frame layer 406 and the set of additional frame layers 408. For instance, the first plurality of partial resolution layers 404a may be grouped into the first base frame layer 406a, and the first set of additional frame layers 408a. In an embodiment, the first base frame layer 406a may correspond to one of the plurality of partial resolution layers 404, with minimum resolution and minimum size. It may be evident to a person skilled in the art that the resolution of an image or frame of video is estimated based on the number of pixels present in the image or frame. It may be apparent to a person skilled in the art that a lower image resolution may correspond to, a lower pixel count and consequently, a lower file size.

In an embodiment, one or more of the plurality of partial resolution layers 404 may be grouped into the set of additional frame layers 408, based on the layer difference information, such as a difference in resolution between the two adjacent layers, in the set of additional frame layers 408. In an embodiment, the first additional frame layer 410 may have a first resolution that is greater than the resolution of the base frame layer 406, by a first data value, such as "X". Similarly, the second additional frame layer 412 may have a second resolution that is greater than the resolution of the first additional frame layer 410, by a second data value, such as "Y". Hence, the processor 202 may be operable to transmit a set of resolution differences, such as "{X, Y}", to the second electronic device 104.

Figure 5:
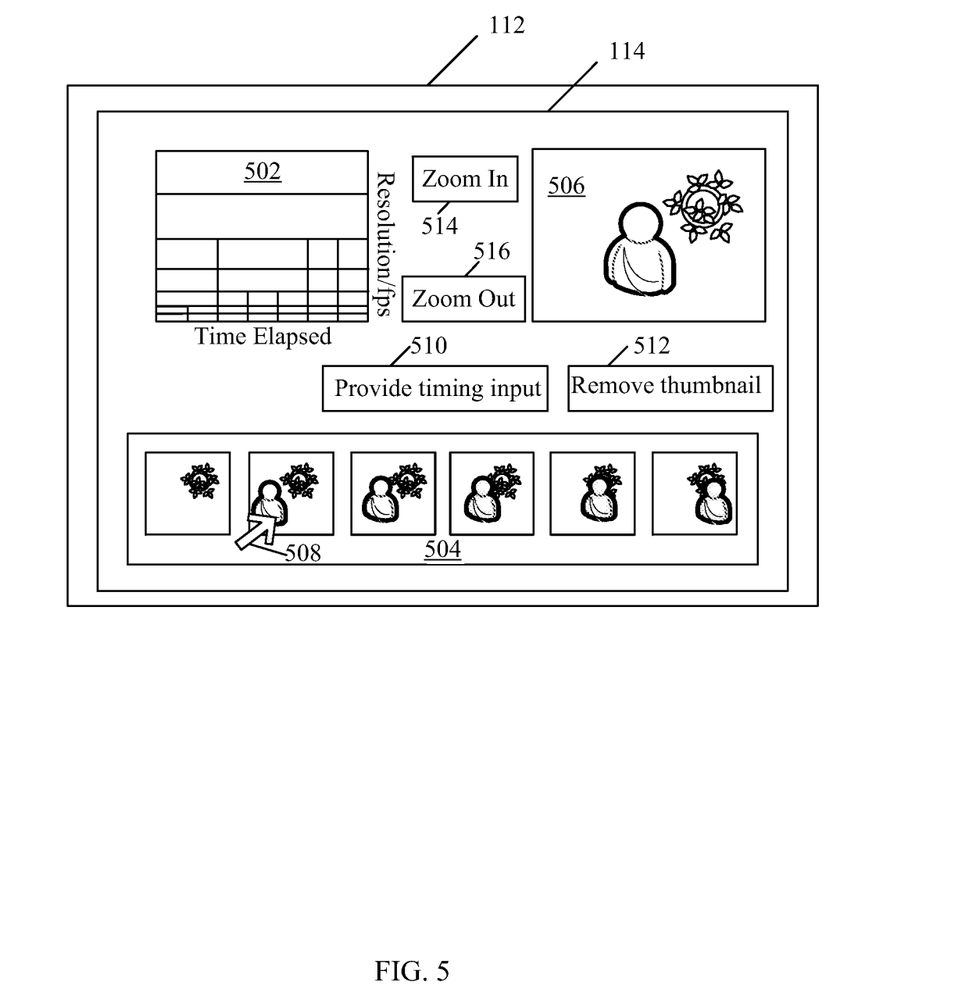
FIG. 5 illustrates an exemplary interface of an exemplary second electronic device, in accordance with an embodiment of the disclosure.

FIG. 5 illustrates an exemplary user interface of the second electronic device 104, in accordance with an embodiment of the disclosure. FIG. 5 is explained in conjunction with elements from FIG. 1, FIG. 2, and FIG. 3. With reference to FIG. 5, there is shown the user interface 114, rendered on the display screen 112. The user interface 114 may comprise a first display segment 502, a second display segment 504, a third display segment 506, and a cursor icon 508. The user interface 114 may further comprise a first option 510, "Provide timing input", and a second option 512, "Remove thumbnail", a third option 514, "Zoom In", and a fourth option 516, "Zoom Out". The first display segment 502 may comprise a timeline that may correspond to the recorded video data. The timeline may provide information about a frame rate at which the recorded video data is received by the second electronic device 104. The second display segment 504 may display a plurality of base frame layers of each frame of the plurality of frames. The third display segment 506 may display one of the plurality of base frame layers, selected by the user 110. The base frame layers may be displayed as thumbnail images, such that one or more modification operations may be performed by the user 110.

In an embodiment, the second display segment 504 may display a plurality of thumbnail images that correspond to the plurality of base frame layers, received by the second electronic device 104. In an embodiment, one or more of the displayed plurality of thumbnail images may be selected by the user 110, via the cursor icon 508. In an embodiment, the selected thumbnail image may be displayed in the third display segment 506.

In an embodiment, based on the selection of one or more of the plurality of thumbnails by the user 110, the priority information that corresponds to one or more of the plurality of base frame layers, is updated to "1". In an embodiment, as one or more of the sets of additional frame layers are received by the second electronic device 104, the resolution of the displayed one or more of the plurality of thumbnails increases. In an embodiment, the user 110 may select the second option 512 to remove a selected thumbnail from the third display segment 506. The user 110 may not want to receive the set of additional frame layers that correspond to the selected thumbnail image. In an embodiment, the user 110 may use the third option 514 and the fourth option 516 to zoom in and zoom out the selected thumbnail image, respectively.

Figure 6:
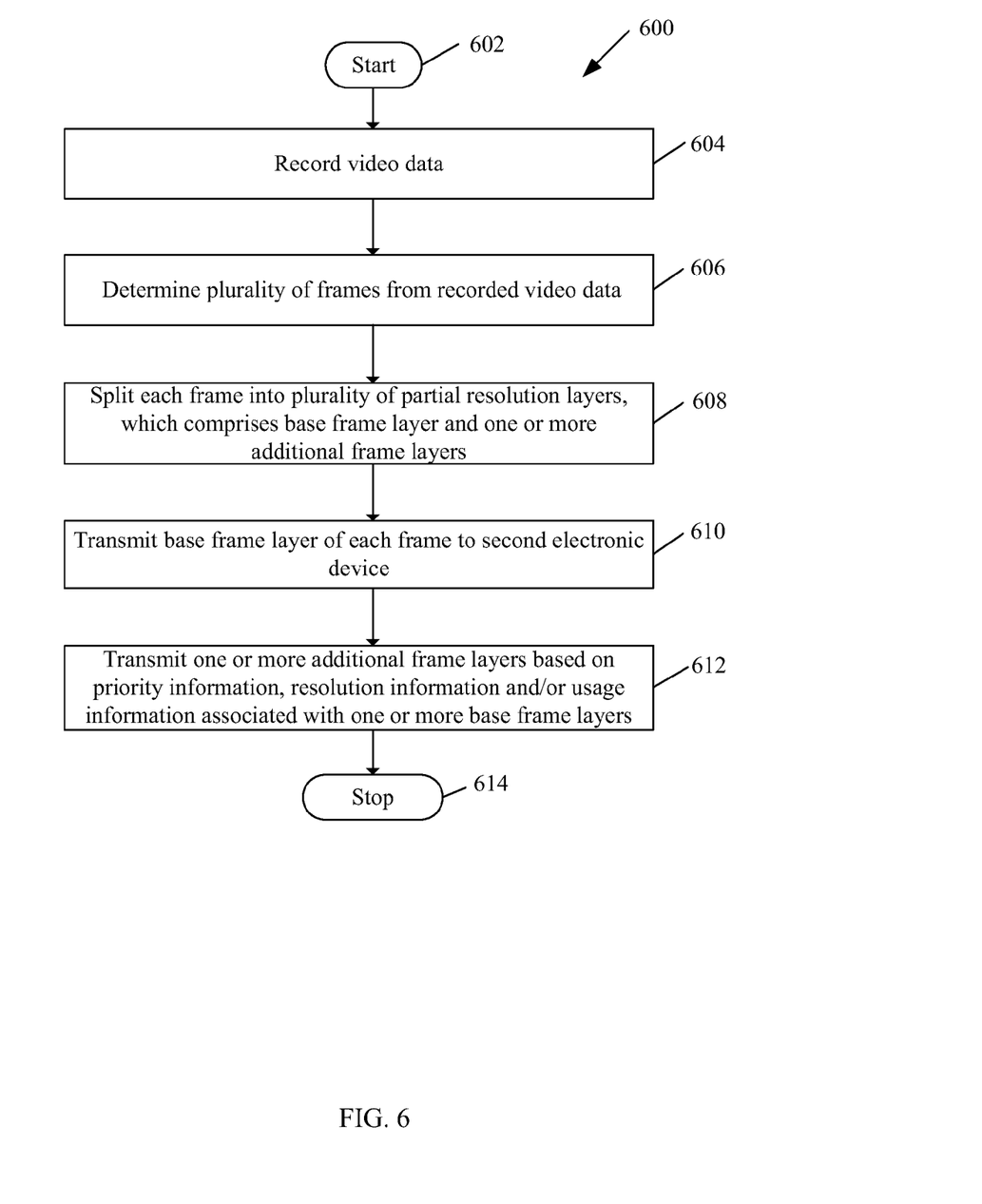
FIG. 6 is a flowchart illustrating a first method for transmitting data, in accordance with an embodiment of the disclosure.

FIG. 6 is a flowchart illustrating a first method 600 for transmitting video data, in accordance with an embodiment of the disclosure. FIG. 6 is described in conjunction with elements of FIG. 1, FIG. 2, FIG. 3, FIG. 4, and FIG. 5. The first method 600 may be implemented in the first electronic device 102, communicatively coupled with the second electronic device 104, and the multimedia server 106, via the communication network 108.

The method 600 begins at step 602. At step 604, video data may be recorded by the processor 202. At step 606, a plurality of frames may be determined from the recorded video data. At step 608, each frame of the plurality of frames 402 may be split into a plurality of partial resolution layers. The plurality of partial resolution layers may comprise a base frame layer and one or more additional frame layers. At step 610, the base frame layer of each frame may be transmitted to the second electronic device 104. The base frame layer of each frame may be transmitted based on priority information, resolution information and/or usage information associated with the base frame layer of each frame. At step 612, the one or more additional frame layers may be transmitted based on one or more of: priority information, resolution information and/or usage information associated with the one or more base frame layers. Control moves to end step 614.

Figure 7:
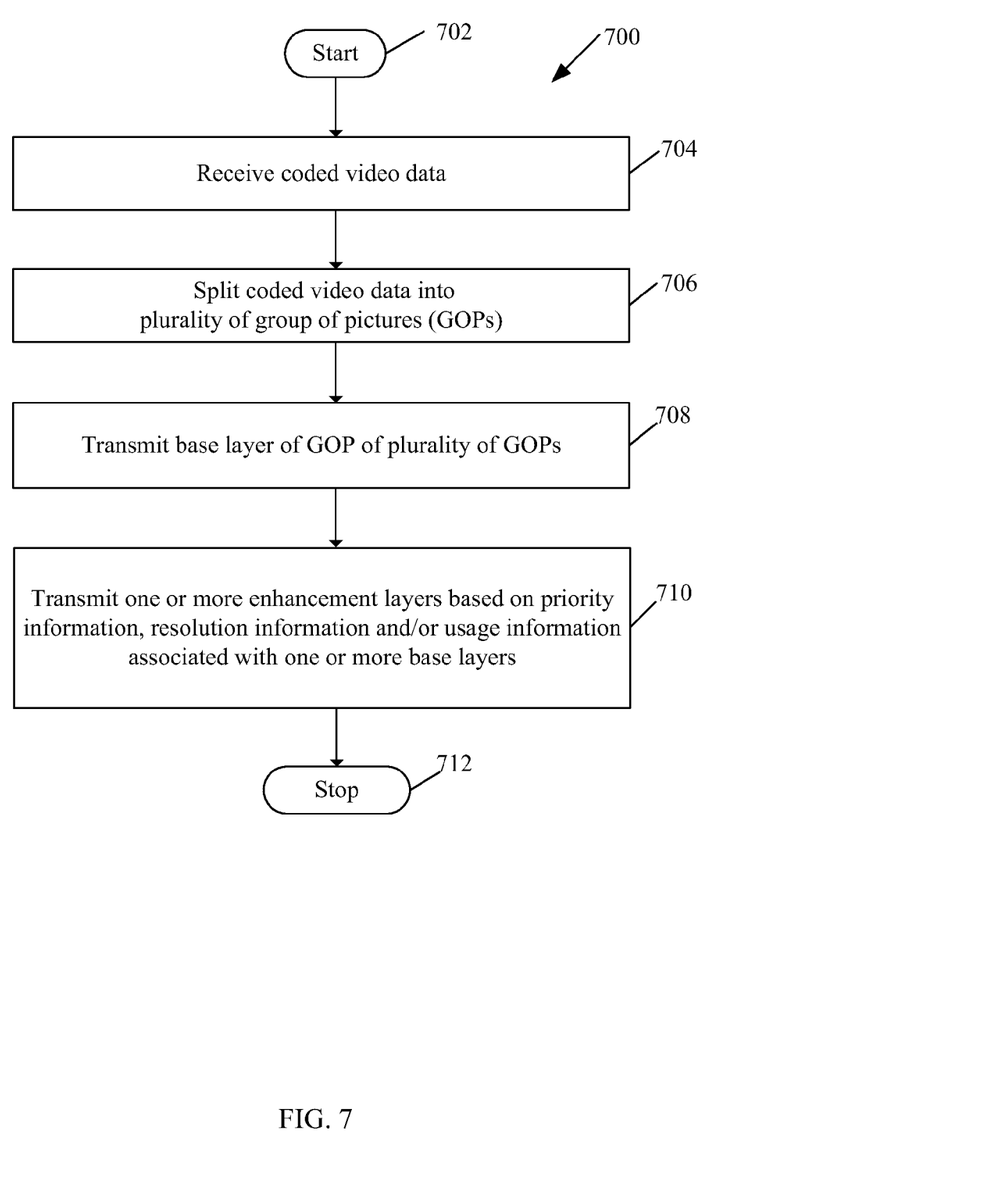
FIG. 7 is a flowchart illustrating a second method for transmitting coded video data, in accordance with an embodiment of the disclosure.

FIG. 7 is a flowchart illustrating a second method 700 for transmitting coded video data, in accordance with an embodiment of the disclosure. FIG. 7 is described in conjunction with elements of FIG. 1, FIG. 2, and FIG. 3. The second method 700 may be implemented in the first electronic device 102, communicatively coupled with the second electronic device 104, and the multimedia server 106, via the communication network 108. The second method 700 begins at step 702.

At step 704, coded video data may be received. At step 706, a plurality of group of pictures (GOPs) may be determined from the received coded video data. Each GOP of the plurality of GOPs may comprise one or more base layers and one or more enhancement layers. At step 708, a base layer of a GOP of the plurality of GOPs may be transmitted. At step 710, one or more enhancement layers may be transmitted based on one or more of: priority information, resolution information and/or usage information associated with one or more base layers. Control moves to end step 712.

In accordance with the present disclosure, a system for transmitting video data is presented. Exemplary aspects of the disclosure may comprise one or more processors, and/or circuits, such as the processor 202 (FIG. 2), in the first electronic device 102 (FIG. 1). The processor 202 may be operable to split each frame 402a (FIG. 4) of the video data into the plurality of partial resolution layers 404a (FIG. 4). Each of the plurality of partial resolution layers may comprise the base frame layer 406a (FIG. 4) and the one or more additional frame layers 408a (FIG. 4). The processor 202 may be operable to transmit the base frame layer 406a of the frame of the video data to the second electronic device 104.

Another exemplary aspect of the disclosure may comprise a system for transmitting coded video data. Exemplary aspects of the disclosure may comprise one or more processors, and/or circuits, such as the processor 202 (FIG. 2), in the first electronic device 102 (FIG. 1). The processor 202 may be operable to determine a plurality of group of pictures (GOPs) from the coded video data. Each of the GOPs may comprise one or more base layer and one or more enhancement layers. The processor 202 may be operable to transmit the base layer of a GOP of the plurality of GOPs to the second electronic device 104.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for transmitting data. The at least one code section in a first electronic device, may cause the machine and/or computer to perform the steps comprising splitting each frame of the video data into a plurality of partial resolution layers. The plurality of partial resolution layers may comprise a base frame layer and additional frame layers. The machine, and/or computer further performs the steps comprising transmitting the base frame layer of each frame of the video data to a second electronic device. The processor may be operable to transmit the base frame layer of the frame of the video data to a second electronic device. The machine, and/or computer further performs the steps further comprising transmitting the one or more additional frame layers of the frame to the second electronic device based on priority information. The priority information may correspond to the transmitted base frame layer of the frame.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a first electronic device:
      splitting each frame of video data into a plurality of partial resolution layers, respectively, wherein each of said plurality of partial resolution layers comprises a base frame layer and a plurality of additional frame layers associated with said base frame layer, wherein a first resolution value of said base frame layer is less than a second resolution value of each of said plurality of additional frame layers corresponding to said base frame layer;
      transmitting said base frame layer and at least one additional frame layer of said plurality of additional frame layers of said frame of said video data to a second electronic device; and
      transmitting said base frame layer and a first additional frame layer of said plurality of additional frame layers adjacent to said base frame layer at a first frame rate and a second frame rate, respectively, wherein said first frame rate is lower than a set threshold and said second frame rate is greater than said first frame rate.

2. The method of claim 1, wherein said at least one additional frame layer of said frame is transmitted to said second electronic device based on at least one of priority information or resolution information associated with said transmitted said base frame layer of said frame.

3. The method of claim 1, further comprising transmitting layer difference information between said first additional frame layer of said plurality of additional frame layers and a second additional frame layer of said plurality of additional frame layers, wherein said first additional frame layer and said second additional frame layer are adjacent to each other.

4. The method of claim 3, wherein said first additional frame layer is determined by said second electronic device based on said transmitted said layer difference information.

5. The method of claim 1, wherein at least a second additional frame layer of said plurality of additional frame layers is transmitted at a third frame rate, wherein said third frame rate is greater than said second frame rate of a previously transmitted said first additional frame layer.

6. The method of claim 1, further comprising transmitting said base frame layer based on at least one of resolution information, frame rate, or priority information of said transmitted said base frame layer.

7. The method of claim 1, further comprising calculating motion information of said video data based on at least one motion detection algorithm.

8. The method of claim 7, further comprising determining priority information of said transmitted said base frame layer based on said calculated said motion information of said video data.

9. The method of claim 1, further comprising receiving a plurality of parameters from said second electronic device, wherein said plurality of parameters comprises usage information associated with said base frame layer of said frame.

10. The method of claim 9, wherein said usage information is calculated based on a selection of said base frame layer of said frame, wherein said at least one additional frame layer of said frame is transmitted to said second electronic device based on said calculated said usage information.

11. The method of claim 9, further comprising determining priority information based on said received plurality of parameters.

12. The method of claim 1, wherein said transmitted said base frame layer of said frame is displayed on said second electronic device.

13. A system, comprising:
one or more processors in a first electronic device, wherein said one or more processors are configured to:
split each frame of video data into a plurality of partial resolution layers, respectively, wherein each of said plurality of partial resolution layers comprises a base frame layer and a plurality of additional frame layers associated with said base frame layer,
wherein a first resolution value of said base frame layer is less than a second resolution value of each of said plurality of additional frame layers corresponding to said base frame layer; and
transmit said base frame layer and a first additional frame layer of said plurality of additional frame layers adjacent to said base frame layer at a first frame rate and a second frame rate, respectively to a second electronic device,
wherein said first frame rate is lower than a set threshold and said second frame rate is greater than said first frame rate.

14. The system of claim 13, wherein said one or more processors are further configured to transmit said plurality of additional frame layers of said frame to said second electronic device based on at least one of priority information, resolution information or usage information associated with said base frame layer of said frame.

15. A method, comprising:
in a first electronic device:
determining a group of pictures (GOP) from coded video data,
wherein said GOP comprises a base layer and a plurality of enhancement layers,
wherein a first resolution value of said base layer is less than a second resolution value of each of said plurality of enhancement layers corresponding to said base layer; and
transmitting said base layer of said GOP and at least one enhancement layer of said plurality of enhancement layers adjacent to said base layer at a first frame rate and a second frame rate, respectively to a second electronic device,
wherein said first frame rate is lower than a set threshold and said second frame rate is greater than said first frame rate.

16. The method of claim 15, further comprising transmitting at least one enhancement layer of said plurality of enhancement layers to said second electronic device based on at least one of priority information, resolution information or usage information associated with said base layer.

17. The method of claim 16, wherein said resolution information comprises said first resolution value associated with said base layer and said second resolution value associated with said plurality of enhancement layers of said GOP.

18. A system, comprising:
one or more processors in a first electronic device, wherein said one or more processors are configured to:
determine a group of pictures (GOP) from coded video data, wherein said GOP comprises a base layer and a plurality of enhancement layers,
wherein a first resolution value of said base layer is less than a second resolution value of each of said plurality of enhancement layers corresponding to said base layer; and
transmit said base layer of said GOP and at least one enhancement layer of said plurality of enhancement layers adjacent to said base layer at a first frame rate and a second frame rate, respectively, to a second electronic device,
wherein said first frame rate is lower than a set threshold and said second frame rate is greater than said first frame rate.

19. The system of claim 18, wherein said one or more processors are further configured to transmit said plurality of enhancement layers to said second electronic device based on at least one of priority information, resolution information or usage information associated with said base layer.

* * * * *